June 24, 1930.  C. H. TWETTEN ET AL  1,766,315
AUTOMOBILE DIRECTION SIGNAL SWITCH
Original Filed May 25, 1927
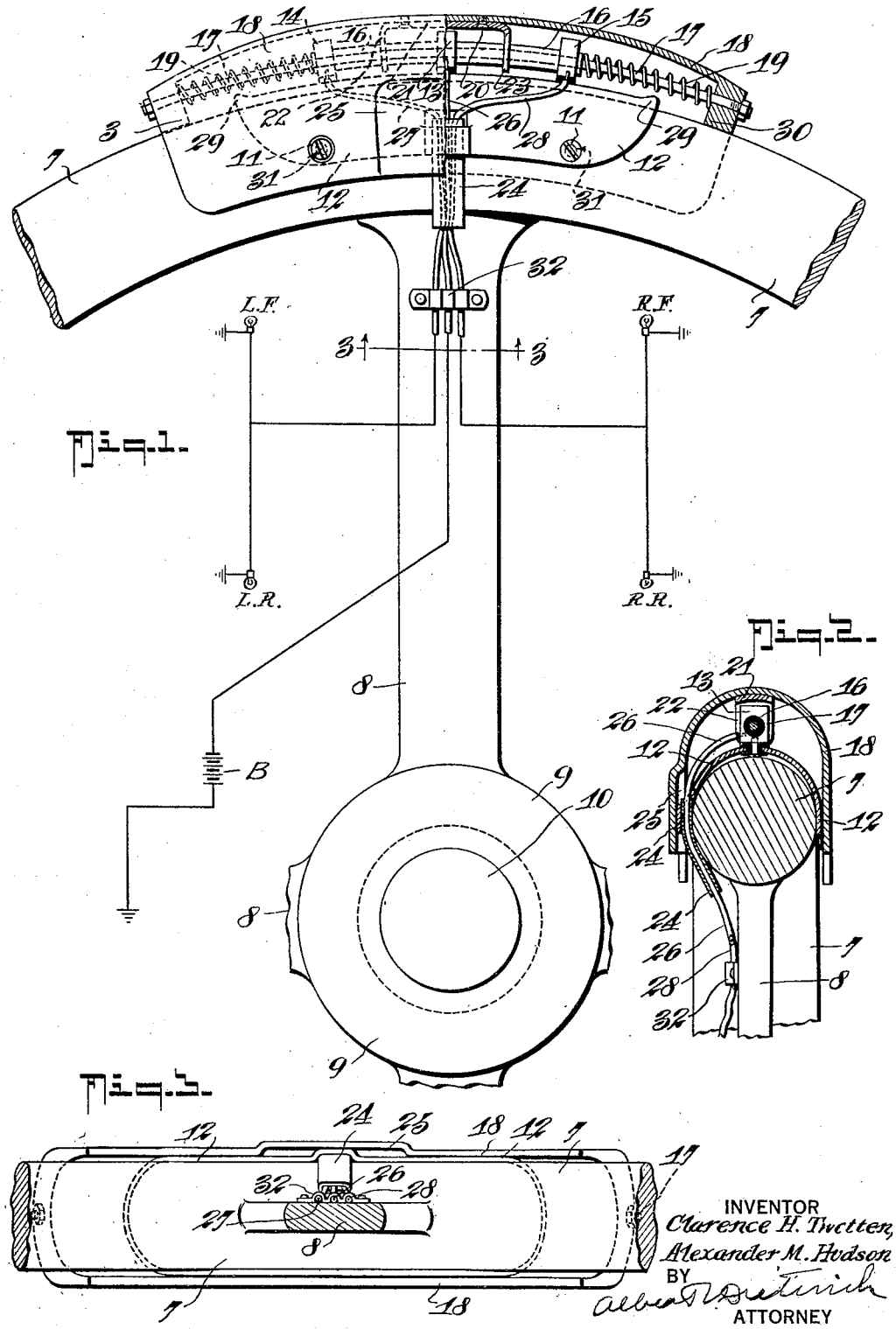
INVENTOR
Clarence H. Twetten,
Alexander M. Hudson
BY
ATTORNEY Patented June 24, 1930

1,766,315

UNITED STATES PATENT OFFICE

CLARENCE H. TWETTEN AND ALEXANDER M. HUDSON, OF ROUND LAKE, MINNESOTA

AUTOMOBILE DIRECTION-SIGNAL SWITCH

Application filed May 25, 1927, Serial No. 194,073. Renewed November 29, 1929.

Our invention relates to direction indicators for auto vehicles, and the object is to improve and simplify the electric switching device usually carried by the hand-wheel and operated by the driver of the car for turning electric current alternately to right and left signal lamps carried by the vehicle and indicating in advance what direction the car is about to be given. The general structure of similar direction signaling devices being already well known the same need not here be illustrated nor shown and described at large. We will confine the disclosure mainly to the new hand-operated switch mechanism carried by the steering hand wheel. Said mechanism is so improved and simplified that only the handle is slidable on the wheel, which structure involves many advantages, as will be understood from the following description.

In the accompanying drawing:

Figure 1 is a plan view of a portion of an automobile steering wheel with the invention mounted thereon, parts being broken away and in section.

Figure 2 is a cross section taken centrally through the switch mechanism and the portion of the steering wheel to which it is attached.

Figure 3 is a radial section taken on the line 3—3 on Figure 1.

Referring to the drawing by reference numerals, 7 is the steering wheel, having spokes 8, and a hub 9 secured on the usual steering shaft 10.

Secured on the front portion of the wheel, by screws 11, is a shell 12 having three perforated contact lugs, 13, 14 and 15 which are insulated from the shell 12 and in which is secured an arched insulation tube 16, through which extends a slidable bolt rod 17. The ends of the rod 17 are secured by nuts, or other means, to the ends of the hollow handle 18, which is normally held at about the middle of the shell by expanding coil springs 19 on the bolt rod 17.

In the handle is secured by screws 20 an electro-conductive strip 21, having its ends formed with resilient contact arms 22 and 23 adapted to contact with the lugs 13, 14 and 15 on the shell, each said arm being provided with an aperture permitting the insulation tube 16 to extend freely through it.

The shell 12 carries a tubular guard 24, for which a clearance 25 is provided in one side of the handle, leaving the handle free to slide on the bolt rod and on the wheel rim.

It will be understood that from a battery B electric current is carried on a suitably insulated wire 26 to the lug 13, and from the lug 14 a suitably insulated wire 27 extends and is connected to both a front lamp L$f$ and a rear lamp L$r$ at the left side of the car, and similarly a wire 28 carries current from lug 15 to a front lamp R$f$, and a rear lamp R$r$ upon the right side of the vehicle. (In this description L means left, R means right, while $r$ means rear and $f$ means front.)

In the operation, when the driver is to turn the car to the right he moves the handle 18 to effect contact of the arm 22 with the lug 13, and the arm 23 with the lug 15. At this point further movement of the handle is stopped by engagement of the horn 29 of the shell 12 with the end wall 30 of the handle 18. The current now passes through the conductor strip 21 into the lug 15 and thence down into the lamps at the right side of the machine, thus signaling in advance that the car is turning to the right. Likewise the left side lamps are lit by pushing the handle 18 in the opposite direction on the hand wheel. In this reverse position the arm 23 touches the lug 13 and the arm 22 touches the lug 14.

It will be observed by reference to Figures 1 and 2 that all of the wires, 26, 27 and 28 are insulated and extended through the guard 24. The current from any and all of the lamps may be grounded to the framework and returned thence to the battery, itself grounded as at G in Fig. 1, or by direct return wires (not shown).

In assembling the parts, the handle and all parts shown in it may be assembled first and then placed on the wheel rim and secured to it by the screws 11 which are threaded in the rim and have countersunk heads reached by a screwdriver inserted through holes 31 in the handle. Any suitable fastening means 32 may be employed for holding the circuit wires to the wheel and to other parts along the lines on which the said wires are laid in making the proper connections of the circuit.

What we claim is:

1. In an automobile direction signalling system wherein is provided right and left hand signalling instrumentalities; a switch mountable on the steering wheel of the automobile to control the actuation of the signalling instrumentalities, said switch comprising a shell partially encircling a portion of and secured to the wheel, three contact lugs secured upon and insulated from the shell, one adjacent its center and one adjacent each end thereof, a segmentally curved hollow handle having its short side open and slidable on the wheel and encasing the shell and contacting lugs, means to slidably-guide and connect the handle on the shell, means tending to hold the handle centered on the shell, and a contact strip carried by the handle and having contact arms to electrically connect the central lug with one or the other of the end lugs accordingly as the handle is moved in one direction or the other.

2. The structure specified in claim 1, in which screws are provided to secure the shell upon the wheel and constitute the sole means for securing the switch upon the wheel, and said handle is provided with lateral apertures to admit a screw driver end to effect applying and removal of the screws.

3. The structure specified in claim 1, in which the means to slidably guide and connect the handle on the shell comprises an arcuate guide tube of insulation carried by the shell lugs, and an arcuate rod secured at its ends to the handle and slidable in the tube, and in which said handle centering means comprises a coil spring encircling the rod at each end and each abutting the tube and the handle at their respective ends.

4. The structure specified in claim 1, in which the contact arms are resilient, and in which the shell is provided with a stop lug at each end to engage the handle and stop movement of the handle on the shell in either direction at the contact lug and contact strip arm contacting position.

5. The structure specified in claim 1, in which the handle is provided with a lateral clearance and the shell carries a tubular guard extending through the clearance and forming a guard conduit for the lugs connecting means adapted for connection with the source of electrical energy and the signalling instrumentalities respectively.

6. An automobile direction signal mountable as an attachment on the steering wheel without cutting away parts of the wheel rim, said switch comprising an arcuate shell open at one side to snugly fit around a portion of a steering wheel, a central and two end contacts secured on and insulated from the shell, screws to secure the shell upon a steering wheel rim, a hollow handle member open at one side to fit over the shell and a portion of the wheel rim and enclosing the shell and its contacts, the said handle having lateral holes through which the screws may be reached to mount or remove them, means to slidably guide and connect the handle on the shell, means tending to hold the handle centered on the shell, and a contact strip carried by the handle and having contact arms to electrically connect the central lug with one or the other of the end lugs accordingly as the handle is moved in one direction or the other.

7. The structure specified in claim 6 in which the handle is provided with a lateral clearance adapted to receive a conduit tube to pass through the clearance and serve to guard circuit wires passing to the contact lugs when the switch is mounted for use.

In testimony whereof we affix our signatures.

CLARENCE H. TWETTEN.
ALEXANDER M. HUDSON.